United States Patent
Heide et al.

(10) Patent No.: US 9,787,614 B2
(45) Date of Patent: *Oct. 10, 2017

(54) COMPOSITE EXTENSION FINITE FIELDS FOR LOW OVERHEAD NETWORK CODING

(71) Applicants: Aalborg Universitet, Aalborg (DK); Steinwurf ApS, Aalborg Øst (DK)

(72) Inventors: Janus Heide, Aalborg (DK); Daniel E. Lucani, Hobro (DK)

(73) Assignees: Aalborg Universitet, Aalborg (DK); Steinwurf ApS, Aalborg Ost (DK)

( * ) Notice: Subject to any disclaimer, the term of this patent is extended or adjusted under 35 U.S.C. 154(b) by 144 days.

This patent is subject to a terminal disclaimer.

(21) Appl. No.: 14/948,414

(22) Filed: Nov. 23, 2015

(65) Prior Publication Data

US 2016/0359770 A1  Dec. 8, 2016

Related U.S. Application Data

(60) Provisional application No. 62/170,349, filed on Jun. 3, 2015.

(51) Int. Cl.
*H04L 12/861* (2013.01)
*H04L 1/00* (2006.01)

(52) U.S. Cl.
CPC .......... *H04L 49/9057* (2013.01); *H04L 1/004* (2013.01); *H04L 1/0057* (2013.01)

(58) Field of Classification Search
CPC ......... H04L 2012/5652; H04L 27/3488; H04L 29/0653; H04L 67/02; H04L 1/0041; H04L 1/0045; H04L 1/0057; H04L 1/0065; H04L 1/004; H04Q 11/0478; H04B 7/15542; H03M 13/11
USPC .................. 370/474, 389; 714/776; 375/220
See application file for complete search history.

(56) References Cited

U.S. PATENT DOCUMENTS

| | | | |
|---|---|---|---|
| 8,792,539 B2* | 7/2014 | Larsson | H04B 7/15521 375/219 |
| 9,647,800 B2* | 5/2017 | Lucani | H04L 1/0065 |
| 2009/0310608 A1* | 12/2009 | Chen | H04L 45/48 370/389 |
| 2010/0061295 A1* | 3/2010 | Preteseille | H04W 76/068 370/328 |
| 2010/0265865 A9* | 10/2010 | Vijayan | H04B 7/12 370/312 |

(Continued)

OTHER PUBLICATIONS

Abdrashitov, et al.; "Sparse Random Linear Network Codes;" http://surat.teerapittayanon.info/ncsim.pdf; Dec. 21, 2011; 20 Pages.

(Continued)

*Primary Examiner* — Afsar M Qureshi
(74) *Attorney, Agent, or Firm* — Daly, Crowley, Mofford & Durkee, LLP

(57) ABSTRACT

Described are network coding (NC) systems and techniques which utilize multiple composite extension finite fields to reduce complexity at various nodes in a network and also reduce overhead due to signal coding coefficients. A coding design uses a series of finite fields where increasingly larger fields are based on a previous smaller field. Techniques disclosed herein can be applied to existing systems using Random Linear Network Coding (RLNC) or Fulcrum codes.

19 Claims, 4 Drawing Sheets

(56) References Cited

U.S. PATENT DOCUMENTS

| | | | | |
|---|---|---|---|---|
| 2012/0063533 | A1* | 3/2012 | Fonseka | H04L 1/0051 375/295 |
| 2014/0233673 | A1* | 8/2014 | Smith | H04L 1/0042 375/296 |
| 2014/0281837 | A1* | 9/2014 | Frigo | H04L 1/0041 714/776 |
| 2014/0379858 | A1* | 12/2014 | Mahdaviani | H04L 67/02 709/217 |
| 2015/0095739 | A1* | 4/2015 | Zhovnirnovsky | H03M 13/616 714/759 |
| 2015/0207881 | A1* | 7/2015 | Tulino | H04L 67/1097 709/213 |
| 2016/0112069 | A1* | 4/2016 | Lablans | H03M 13/15 714/752 |

OTHER PUBLICATIONS

Ahlswede, et al.; "Network Information Flow;" IEEE Transactions on Information Theory; vol. 46, No. 4; Jul. 2000; 13 Pages.
Dimakis, et al.; "A Survey on Network Codes for Distributed Storage;" Proceedings of the IEEE; vol. 99, No. 3; Mar. 2011; 14 Pages.
Elias, et al.; "A Note on the Maximum Flow Through a Network;" IRE Transactions on Information Theory; vol. 2, No. 4; Jan. 1956; 3 Pages.
Feizi, et. al.; "Tunable Sparse Network Coding;" International Zurich Seminar on Communications (IZS); Feb. 29-Mar. 2, 2012; 4 Pages.
Forney; "Concatenated Codes;" Technical Report 440; Massachusetts Institute of Technology; Dec. 1, 1965; 116 Pages.
Gkantisidis, et al.; "Comprehensive View of a Live Network Coding P2P System;" Proceedings of the 6th ACM SIGCOMM Conference on Internet Measurement, ser. IMC '06; Oct. 25-27, 2006; 11 Pages.
Heide, et al.; "Network Coding for Mobile Devices—Systematic Binary Random Rateless Codes;" IEEE International Conference on Communications (ICC) Workshops; Jan. 2009; 6 Pages.
Heide, et al.; "On Code Parameters and Coding Vector Representation for Practical RLNC;" IEEE International Conference on Communications (ICC) Workshops; Jan. 2011; 5 Pages.
Ho, et al.; "A Random Linear Network Coding Approach to Multicast;" IEEE Transactions on Information Theory; vol. 52, No. 10; Oct. 2006; 17 Pages.
Karande, et al.; "Multicast Throughput Order of Network Coding in Wireless Ad-hoc Networks;" IEEE Transactions on Communications; Jan. 2010; 10 Pages.
Katti, et al.; "XORs in the Air: Practical Wireless Network Coding;" IEEE/ACM Transactions on Networking; vol. 16, No. 3; Jun. 2008; 14 Pages.
Kim; "Concatenated Network Coding for Large-Scale Multi-Hop Wireless Networks:" IEEE Wireless Communications and Networking Conference (WCNC); Jan. 2007; 5 Pages.
Lee, et al.; "On Jacket Transforms Over Finite Fields;" IEEE International Symposium on Information Theory (ISIT); Jun. 28-Jul. 3, 2009; 5 Pages.
Li, et al.; "Linear Network Coding;" IEEE Transactions on Information Theory, vol. 49, No. 2; Feb. 2003; 11 Pages.
Lucani, et al.; "Random Linear Network Coding for Time-Division Duplexing: Field Size Considerations;" IEEE Global Telecom Conference (GLOBECOM); Jan. 2009; 6 Pages.
Maymounkov; "Perpetual Codes: Cache-friendly Coding;" Unpublished draft; Retrieved Sep. 2, 2011 (Online); http://dos.csail.mit.edu/~petar/papers/maymounkov-perpetual.ps; Jan. 2006; 34 Pages.
Nistor, et al.; "A Total Energy Approach to Protocol Design in Coded Wireless Sensor Networks;" 2012 International Symposium on Network Coding (NetCod); Jan. 2012; 6 Pages.
Nistor, et al.; "On the Delay Distribution of Random Linear Network Coding;" IEEE Journal on Selected Areas in Communications; vol. 29, No. 5; May 2011; 10 Pages.

Pedersen, et al.; "Kodo: An Open and Research Oriented Network Coding Library;" Lecture Notes in Computer Science; vol. 6827; Jan. 2011; 8 Pages.
Pedersen, et al.; "Picture Viewer—A Mobile Application Using Network Coding;" European Wireless Conference (EW); Jan. 2009; 6 Pages.
Prior, et al.; "Network Coding Protocols for Smart Grid Communications;" IEEE Transactions on Smart Grid; Jan. 2014; 9 Pages.
Qualcomm; Raptorq—The Superior FEC Technology; (Online); http://www.qualcomm.com/media/documents/raptorq-data-sheet; Dec. 2013; 2 Pages.
Seferoglu, et al.; "Video-Aware Opportunistic Network Coding over Wireless Networks;" IEEE Journal on Selected Areas in Communications; vol. 27, No. 5; Jun. 2009; 16 Pages.
Shokrollahi; "Raptor Codes;" IEEE Transactions on Information Theory; vol. 52, No. 6; Jun. 2006; pp. 16 Pages.
Steinwurf ApS. (2012) Kodo Git repository on github; http://github.com/Steinwurf/kodo; 2 Pages.
Thibault, et al.; "A Family of Concatenated Network Codes for Improved Performance with Generations;" Journal of Communications and Networks, vol. 10, No. 4; Dec. 2008; 12 Pages.
Thomos, et al.; "Toward One Symbol Network Coding Vectors;" IEEE Communications Letters, vol. 16, No. 11; Nov. 2012; 4 Pages.
Vilela, et al.; "Lightweight Security for Network Coding;" IEEE International Conference on Communications (ICC); Jan. 2008; 5 Pages.
Vingelmann, et al.; "Synchronized Multimedia Streaming on the iPhone Platform with Network Coding;" IEEE Communications Magazine, vol. 49, No. 6; Jun. 2011; 7 Pages.
Yin, et al.; "Performance of Random Linear Network Codes Concatenated with Reed-Solomon Codes using Turbo Decoding;" 6th International Symposium on Turbo Codes & Iterative Information Processing (ISTC); Jan. 2010; 5 Pages.
Zhang, et al.; "P-Coding: Secure Network Coding against Eavesdropping Attacks;" IEEE INFOCOM; Jan. 2010; 9 Pages.
Zhao, et al.; "Comparison of Analytical and Measured Performance Results on Network Coding in IEEE 802.11 Ad-Hoc Networks;" 2012 International Symposium on Network Coding (NetCod); Jan. 2012; 6 Pages.
Zhao, et al.; "On Analyzing and Improving COPE Performance;" Info. Theory and App. Workshop (ITA); Jan. 2010; 6 Pages.
Heide et al., "Decoding Algorithms for Random Linear Network Codes;" Conference Paper from Networking 2011 Workshop, vol. 6827 of the series Lecture Notes in Computer Science; May 13, 2011; 8 Pages.
Heide et al., "A Perpetual Code for Network Coding;" in IEEE Vehicular Technology Conference (VTC)—Wireless Networks and Security Symposium; 2013; 6 Pages.
Ho et al., "The Benefits of Coding Over Routing in a Randomized Setting;" Proceedings of the IEEE International Symposium on Information Theory (ISIT); Jun. 29, 2003; 6 Pages.
Chou et al., "Practical Network Coding;" Allerton Conference on Communication Control and Computing, vol. 4; 2003; 10 Pages.
Trullols-Cruces et al., "Exact Decoding Probability Under Random Linear Network Coding;" IEEE Communications Letters, vol. 15, No. 1; Jan. 2011; 3 Pages.
Li et al., "Singularity Probability Analysis for Sparse Random Linear Network Coding;" IEEE International Conference on Communications (ICC); Jun. 2011; 5 Pages.
Guenther et al., "Efficient GF Arithmetic for Linear Network Coding using Hardware SIMD Extensions;" International Symposium on Network Coding (NetCod); Jul. 2014; 7 Pages.
Fragouli et al., "Network Coding: An Instant Primer;" SIGCOMM Computer Commmunications Review, vol. 36, No. 1; Jan. 2006; 6 Pages.
Lucani et al., "On Coding for Delay—Network Coding for Time-Division Duplexing;" IEEE Transactions on Information Theory, vol. 58, No. 4; Apr. 2012; 19 Pages.
Jaggi et al., "Polynomial Time Algorithms for Multicast Network Code Construction;" IEEE Transactions on Information Theory, vol. 51, No. 6; Jun. 2005; 10 Pages.
Lucani et al., "Coping with the Upcoming Heterogeneity in 5G Communications and Storage Using Fulcrum Network Codes;"

(56) References Cited

OTHER PUBLICATIONS

Proceedings of the International Symposium on Wireless Communication Systems (ISWCS); Aug. 2014; 5 Pages.

Paramanathan et al., "Lean and Mean: Network Coding for Commercial Devices;" IEEE Wireless Communications, vol. 20, No. 5; Oct. 2013; 14 Pages.

Office Action dated Feb. 16, 2016 for U.S. Appl. No. 14/242,086; 22 Pages.

Response to Office Action dated Feb. 16, 2016 corresponding to U.S. Appl. No. 14/242,086; Response filed on May 16, 2016; 11 Pages.

U.S. Final Office Action dated Sep. 9, 2016 corresponding to U.S. Appl. No. 14/242,086; 21 Pages.

Response to Final Office Action dated Sep. 9, 2016 corresponding to U.S. Appl. No. 14/242,086; Response filed on Dec. 22, 2016; 9 Pages.

Supplemental Amendment filed on Dec. 22, 2016 corresponding to U.S. Appl. No. 14/242,086; 5 Pages.

Notice of Allowance dated Jan. 27, 2017 for U.S. Appl. No. 14/242,086; 7 pages.

\* cited by examiner $$\hat{V}^T = \begin{bmatrix} \mathbb{F}_2 & \mathbb{F}_2 & \mathbb{F}_2 & \mathbb{F}_2 \\ \mathbb{F}_2 & \mathbb{F}_2 & \mathbb{F}_2 & \mathbb{F}_2 \\ \mathbb{F}_{22} & \mathbb{F}_{22} & \mathbb{F}_{22} & \mathbb{F}_{22} \\ \mathbb{F}_{222} & \mathbb{F}_{222} & \mathbb{F}_{222} & \mathbb{F}_{222} \end{bmatrix} \longrightarrow \begin{bmatrix} 1 & 0 & 0 & 0 \\ 0 & \mathbb{F}_2 & \mathbb{F}_{22} & \mathbb{F}_{222} \\ 0 & 0 & \mathbb{F}_{22} & \mathbb{F}_{222} \\ 0 & 1 & \mathbb{F}_{22} & \mathbb{F}_{222} \end{bmatrix}$$

COMPOSITE EXTENSION FINITE FIELDS FOR LOW OVERHEAD NETWORK CODING

CROSS REFERENCE TO RELATED APPLICATION

This application claims the benefit under 35 U.S.C. §119(e) of U.S. Provisional Application No. 62/170,349 filed Jun. 3, 2015, which application is incorporated herein by reference in its entirety.

BACKGROUND

As is known in the art, network coding (NC) is a technique whereby coded packets are generated as linear combinations of source (or "original") data packets, multiplying them by coefficients chosen from a finite field. NC enables recombination of data within a computer network and thus breaks with the end-to-end view on data flows in store-and-forward networks.

The ability to compute in the network provides enhanced performance and enables disruptive and flexible designs of future computer networks. This flexibility makes NC suitable in less structured, highly dynamic, and highly heterogeneous settings, and therefore a good fit, for example, for Internet of Things and 5G. NC techniques have shown significant gains (e.g. in terms of improved performance and/or energy efficiency) in a multitude of applications ranging from wireless networks and multimedia transmission, to distributed storage and peer-to-peer (P2P) networks.

Random Linear Network Coding (RLNC) offers a distributed approach to implementing NC by randomly mixing data packets. Among other benefits, RLNC provides allows for distributed functional repair within storage systems. However, RLNC can add computational complexity to sources, receivers, and intermediate nodes, which can potentially decrease the operation time of battery-driven devices or become a bottleneck in highly loaded servers, routers, and switches. One known approach to decrease this complexity is to divide the data over which coding is performed in so-called "generations." This approach effectively controls the complexity, but adds additional communication overhead in two ways. First, overhead due to the reception of linearly dependent combinations, which is particularly relevant if the underlying finite field is small. Second, it is necessary to distribute the coding coefficient vector, which describes how coding was performed, along with the coded packet. Overhead from the coding vector (sometimes referred to as "signaling overhead") can be addressed by distributing seed values for a pseudo random function, but this results in the loss of ability to recode, which is a significant benefit of NC.

As is also known in the art, the choice of NC parameters, such as field size, generation size, and sparsity, can have an impact on signaling overhead, overhead due to linear dependency, and processing requirements. An existing technique to achieve a low overhead and high processing speeds while maintaining simple recoding as in RLNC is Fulcrum network codes, which are described in U.S. patent application Ser. No. 14/242,086, filed on Apr. 1, 2014, and herein incorporated by reference in its entirety. As is known, Fulcrum network codes allow decoding (and recoding) in either $\mathbb{F}_2$ or a higher field extension field $\mathbb{F}_{2^k}$.

SUMMARY

Described herein are concepts, techniques, and structures for network coding using finite fields of different sizes wherein each field (except for a base field) is an extension of a previously defined field. For example, an example code design sues a series of composite fields constructed from $\mathbb{F}_2$ to obtain $\mathbb{F}_{2^2}$, from it construct $$\mathbb{F}_{2^{2^2}},$$

and from it construct $$\mathbb{F}_{2^{2^{2^2}}},$$

etc. As a consequence, field operations performed in a given field are valid operations in all its extension fields. Composite extension fields can be applied to existing random linear network codes (RLNC) systems as well as systems that utilize Fulcrum network codes. A new code design based on the use of composite extension fields is also described herein.

The new code design, referred to herein as "Telescopic codes," decreases the total communication overhead while retaining the possibility to recode. A Telescopic code can leverage multiple composite extension fields in a single generation of packets to achieve a better tradeoff between two sources of overhead: linear dependency and representation of the coding vectors. Using Telescopic codes, most computations are performed over small and fast field (with only a relatively small number of operations performed over larger fields), thereby reducing the complexity of encoding, recoding, and decoding operations and leading to higher throughput.

BRIEF DESCRIPTION OF THE DRAWINGS

The concepts, structures, and techniques sought to be protected herein may be more fully understood from the following detailed description of the drawings, in which:

FIG. 3 shows an illustrative coding matrix during decoding; and

Figure 1:
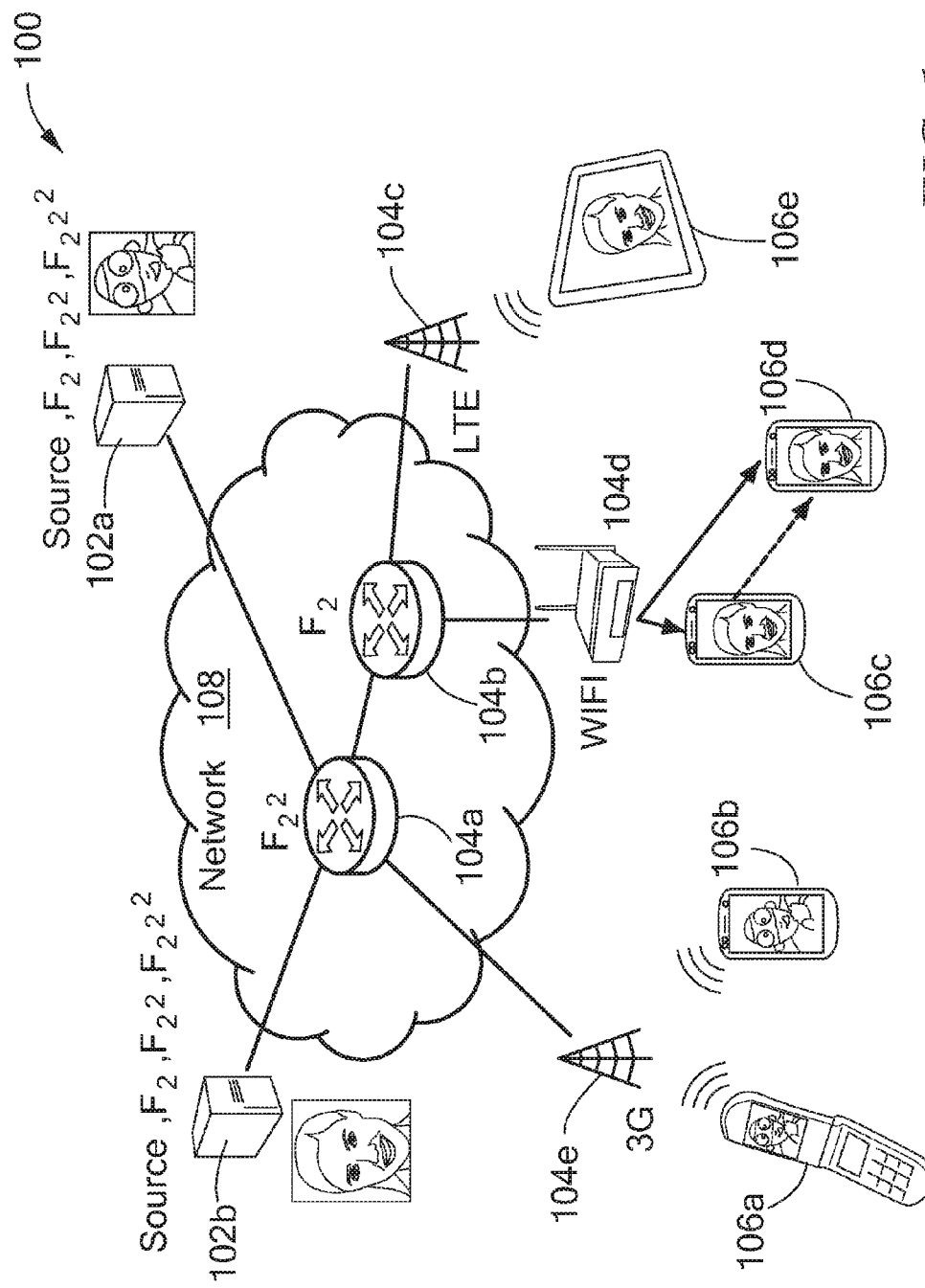
FIG. 1 is a network diagram of an exemplary network using network coding.

The drawings are not necessarily to scale, or inclusive of all elements of a system, emphasis instead generally being placed upon illustrating the concepts, structures, and techniques sought to be protected herein.

DETAILED DESCRIPTION

Before describing exemplary embodiments of the systems and methods used to teach the concepts, structures, and techniques sought to be protected herein, some introductory terminology used in conjunction with the exemplary embodiments are explained.

A "network" is made up of a plurality of processing sites generally referred to as "stations" or "nodes" connected by one or more physical and/or logical connections. When the connections enable transmission of a signal between the nodes, the connections are generally referred to as links. Links are sometimes unidirectional (i.e. transmission of a signal in one direction between the nodes) and sometimes are bidirectional (i.e. transmission of signals in both direction between the nodes).

Each node typically performs a switching function and one or more additional functions. The nodes may be coupled together in a variety of different network structures typically referred to as network topologies. For example, network nodes may be coupled in a so-called mesh topologies, ring (or circular) topologies, star topologies and tree topologies. Other topologies are also known.

The transmission of a signal from a first or source node to a second or receiver node may involve the transmission of the signal through one or more intermediate links and nodes coupled between the source node and the receiver node. Such a succession of links and nodes between a source node and a receiver node is referred to as a path.

As used herein, the term "wireline link" is used to describe a link between two nodes of a network that comprises any type of physical or hardwired connection. The term "wireless link" is used to describe a link that comprises any type of wireless connection (e.g., radio frequency (RF), cellular, wifi, point-to-point, mesh, and/or optical connection).

The terms "source" and "source node" are used herein to refer to a node in a network that transmits (or sends) packets (referred to as "source packets") to one or more other nodes via one or more links in the network. The term "intermediate node" is used herein to refer to a node in the network that both receives packets from one or more other nodes via one or more links in the network and sends packets to one or more additional nodes via one or more links in the network. The terms "sink, "sink node," "receiver," and "receiver node" are used herein to refer to a node in a network that receives packets through a link in the network. It should be understood that the framework described herein does not impose any limitations on the operation of particular nodes and, therefore, any node may function as a source, an intermediate node, and/or a receiver (notwithstanding any physical limitations of the network).

The terms "packet" and "symbol" are used herein to refer to any unit of data residing on a node or transmitted through a network. It should be understood that the concepts, structures, and techniques described herein are not limited to any particular packet/symbol sizes, data dimensions, or data formats. In some embodiments, a packet described herein comprises a User Datagram Protocol (UDP) packet and/or an Internet Protocol (IP) packet.

The term "encoded packet" refers to a linear combination source packets according to a coding vector. In some embodiments, encoded packets and a coding vector (i.e., the coding vector that describes the linear combination coding process) are stored and/or transmitted together. In addition to be being a linear combination of multiple source packets, an encoded packet could also correspond to combination of a single source packet or even to none of the original packets (the zero symbol).

The term "field size" refers to the number of elements (or "order") of a given finite field (or "Galois field").

The term "recode" is used herein to refer to a process whereby a plurality of encoded data packets are combined to generate new coded packets. The term "re-encode" herein refers to a process whereby one or more data packets are decoded to recover the original information, and then the original information is encoded to generate new coded packets. Thus, re-encoding involves decoding whereas recoding does not.

Referring now to FIG. 1, an illustrative network 100 is provided from a plurality of source nodes 102a, 102b (generally denoted 102), a plurality of intermediate nodes 104a-104e (generally denoted 104), and a plurality of receivers 106a-106d (generally denoted 106). The nodes 102, 104, 106 may be connected by a combination of wireline links, such as between nodes 102a and 104a, and/or wireless links, such as between nodes 104e and 106a. Some (or all) of the intermediate nodes 104 may be considered part of a network 108 that connects sources 102 and receivers 106. In various embodiments, the network 108 is a wide area network (WAN) 108, such as the Internet.

It should be understood that the network shown in FIG. 1 is merely illustrative and that the concepts, structures, and techniques sought to be protected herein are not limited to any particular network topology and may be used generally with any number of source, intermediate, and receiver nodes, connected by any number and arrangement of wireline and/or wireless links.

In operation, the sources 102 send data packets along paths to the receivers 106, by way of intermediate nodes 104. The sources may encode data packets using a code vector having elements in multiple fields with different sizes, wherein each field is an extension of a previously defined field. For example, the sources may code data packets using field sizes $\mathbb{F}_2$, $\mathbb{F}_{2^2}$, $$\mathbb{F}_{2^{2^2}},$$

etc. As another example, the multiple fields may include $\mathbb{F}_2$, $\mathbb{F}_{2^3}$, $$\mathbb{F}_{2^{3^5}},$$

etc. Such fields are referred to herein as "composite extension fields" and are described herein below.

The intermediate nodes 104 can recode using a given one of the field sizes (e.g., the lowest field size, such as $\mathbb{F}_2$, or the highest field size, such as $$\mathbb{F}_{2^{2^2}}),$$

or can recode using multiple field sizes. The field sizes and recode strategy may be selected based upon the capabilities of the source, the capabilities of the intermediate nodes, the capabilities of the receivers, and/or based upon desired network flow characteristics. In the exemplary network 100, a first intermediate node 104a recodes in $\mathbb{F}_{2^2}$, whereas a second intermediate node 104b recodes in $\mathbb{F}_2$. A receiver 106 receives and accumulates network-coded/recoded packets, and, by way of a multiple-field-size Gaussian elimination process, can retrieve the source data packets.

Composite extension fields are chosen to allow compatibility between the operations performed in different fields, so that different nodes as well as different parts of the encoding/decoding process can be performed in the various finite fields. To generate composite extension fields, polynomial arithmetic may be employed, using as a base field the previous extension field generated. In particular, each element in a composite field can be expressed as:

$$f_j(x) = \sum_{i=0}^{n} a_{ji} x^i \quad (2)$$

where $a_i$ is an element in the base field, and n is the degree of the polynomial. For two elements of the composite field $f_1(x)$ and $f_2(x)$, the addition operation can be expressed as:

$$f_1(x) + f_2(x) = \sum_{i=0}^{n} (a_{1i} + a_{2i}) x^i \quad (2)$$

where $a_{1i} + a_{2i}$ uses the addition operation of the base field.

For multiplication of $f_1(x) \cdot f_2(x)$, two steps can be used. First, a product of polynomials and then a long division using a primitive polynomial m(x) to obtain the remainder. Operations between the $a_{ji}$ coefficients follow the rules of the base finite field. The primitive polynomial may also be obtained using the rules and elements of the base field.

In particular embodiments, nodes of the network 100 utilize a series of composite fields constructed as powers of two starting with the base field $\mathbb{F}_2$ to obtain $\mathbb{F}_2$, $\mathbb{F}_{2^2}$, $$\mathbb{F}_{2^{2^2}},$$

etc. This choice or composite fields may provide several advantages. For example, there already exist efficient implementations for these specific field sizes. Moreover, it will be appreciated that such fields fit data types in a typical computer system. Additionally, these field sizes provide high granularity for choosing different levels of computational complexity in the network. It should be appreciated that other configurations are possible so long as the starting point is a finite field, e.g., $\mathbb{F}_{2^3}$ could be used as the base field.

In addition to the particular series of composite extension fields described above, it may be convenient to select the degree n=1 for each new composite field created. This results in very simple addition and product operations. For addition, $$f_1(x) + f_2(x) = (a_{10} + a_{20}) + (a_{11} + a_{21}) x \quad (3)$$

which means that the addition is a bitwise XOR of the different symbols. For the product operation, $$f_1(x) \cdot f_2(x) = \begin{pmatrix} a_{10} \cdot a_{20} + (a_{11} \cdot a_{20} + a_{10} \cdot a_{21}) x + \\ (a_{11} \cdot a_{21}) x^2 \end{pmatrix} \mod m(x) \quad (4)$$

where m(x) is a degree two (2) polynomial. This facilitates finding m(x). A valid m(x) first needs to comply with $m(x) = x^2 + m_1 x + m_0 \neq (x + b_1)(x + b_2)$ for all values of $b_1, b_2 \neq 0$ in the base field to be irreducible. Using this search procedure, it can be shown that irreducible polynomials of this form are common for the various fields (i.e., there are a sufficient number of such polynomials for many applications). For example, for $\mathbb{F}_{2^2}$ there are six (6) irreducible polynomials and for $$\mathbb{F}_{2^{2^2}}$$

there are one hundred and twenty (120) irreducible polynomials once an $$\mathbb{F}_{2^{2^2}}$$

polynomial is selected.

After determining that m(x) is irreducible, a determination may be made as to whether it is primitive. Several approaches can be used. One standard method consists of computing the long division of $x^k - 1$ modulo m(x) for increasing integer k from k=1. Consider q as the field size of the base field. If the first value of k for which m(x) divides $x^k - 1$ (i.e., the remainder of the long division is zero) is given by $k = q^n - 1 = q^2 - 1$, then m(x) is also primitive. The number of primitive polynomials is also sufficiently large for many applications. For example, for $\mathbb{F}_{2^2}$ there are four (4) primitive polynomials and for $$\mathbb{F}_{2^{2^2}}$$

there are sixty-four (62) primitive polynomials.

TABLE 1 shows one example of polynomials that may be used for the series of composite fields $\mathbb{F}_2$, $\mathbb{F}_{2^2}$, $$\mathbb{F}_{2^{2^2}}, \mathbb{F}_{2^{2^{2^2}}}, \mathbb{F}_{2^{2^{2^{2^2}}}}.$$

TABLE 1

| Field | q | Polynomial |
|---|---|---|
| $\mathbb{F}_2$ | 2 | |
| $\mathbb{F}_{2^2}$ | $2^2$ | $x^2 + x + 1$ |
| $\mathbb{F}_{2^{2^2}}$ | $2^4$ | $x^2 + x + 2$ |
| $\mathbb{F}_{2^{2^{2^2}}}$ | $2^8$ | $x^2 + x + 9$ |
| $\mathbb{F}_{2^{2^{2^{2^2}}}}$ | $2^{16}$ | $x^2 + x + 130$ |

By design, multiplying an element of an extension field, $f_1(x) = a_{10} + a_{11} x$, by another element that could be represented in the base field, i.e., $f_2(x) = a_{20} + a_{21} x$ since $a_{21} = 0$, results in $$f_1(x) f_2(x) = a_{10} \cdot a_{20} + a_{11} \cdot a_{20} x \quad (5)$$

without needing to use the irreducible polynomial. This makes the product operation in the base field (and with elements from it) fully compatible with the product operation in the extension field.

For example, consider the four bits 1001. These bits can be interpreted as a single element (9) in $$\mathbb{F}_{2^{2^2}},$$

or two concatenated elements (2 and 1) in $\mathbb{F}_{2^2}$. If the four bits are multiplied by two (2) in the first field, i.e., 0010, the result is element 14 (1110). At the same time, multiplying each individual element from the base field by two (2) results in $2 \cdot 2 = 3$ (11) and $2 \cdot 1 = 2$ (10), and concatenating these two results gives 1110. It is appreciated herein that is possible because two (2) is a member of both fields and that this property is not guaranteed by other finite fields created as direct extensions of $\mathbb{F}_2$.

TABLE 2

| ⊗  | 0 | 1  | 2 | 3  | 4  | ... | 15 |
|----|---|----|---|----|----|-----|----|
| 0  | 0 | 0  | 0 | 0  | 0  | ... | 0  |
| 1  | 0 | 1  | 2 | 3  | 4  |     | 15 |
| 2  | 0 | 2  | 3 | 1  | 8  |     | 5  |
| 3  | 0 | 3  | 1 | 2  | 12 |     | 10 |
| 4  | 0 | 4  | 8 | 12 | 6  |     | 1  |
| .  |   |    |   |    |    | .   |    |
| .  |   |    |   |    |    |  .  |    |
| .  |   |    |   |    |    |   . |    |
| 15 | 0 | 15 | 5 | 10 | 1  | ... | 9  |

To improve performance (e.g., processing speed), a lookup table for addition and/or multiplication between various field elements can be constructed. For example, Table 2 illustrates product operations between two elements for fields $\mathbb{F}_2$, $\mathbb{F}_{2^2}$, $$\mathbb{F}_{2^2}.$$

It is noted that for larger fields, e.g., $\mathbb{F}_{2^{32}}$, a lookup table implementation is not practical due to the necessary memory to store the tables.

It is appreciated herein that composite extension fields provides opportunities to improve the design of NC systems. The use of composite extension fields can lead to, for example, a potential reduction in the signaling and/or allowing a reduction in the overall computational complexity at various nodes of the network 100. Moreover, it is appreciated that composite extension fields can be applied to existing code designs as well as used as the basis for new code designs.

In one example, composite extension fields can be applied to existing Random Linear Network Coding (RLNC) systems that use a single field size in all coding operations, both at end devices (e.g., receivers 106) and at intermediate nodes 104. Using a single field size can create a heavy computational burden on intermediate nodes 104, which may need to process multiple flows. Composite extension fields can be applied to RLNC systems to allow intermediate nodes 104 to choose what field to recode with according to their current work load without requiring an end-to-end change in parameters (i.e., without require coordination between sources 102, intermediate nodes 104, or receivers 106). This can result in higher flexibility while maintaining the per packet overhead.

As another example, composite extension fields can be applied to systems that use Fulcrum network codes, which permit a fluid allocation of complexity in the network, maintaining the performance of high fields and a low per packet overhead for signaling. Composite extension fields can allow for the inner code in Fulcrum to be designed with a higher field from $\mathbb{F}_{2^k}$, but allowing intermediate nodes to operate as low in field as $\mathbb{F}_2$ and maintain compatibility with the high field of the outer code.

A new application of composite extension fields are so-called "Telescopic codes," which are specifically designed to use multiple composite extension fields in the same generation of data packets. Telescopic codes can reduce the per packet overhead by using a large number of linear coefficients in small field sizes, and maintain a low overhead from linearly dependent combinations, by leveraging enough coefficients in fields of larger size.

Consider coding over g packets each of size B bits. In traditional RLNC, the data in each packet is represented by a Finite Field (FF) of size q. A coded packet, $\vec{x}$, is generated at the source by combining all g packets in the block as defined by a coding vector $\vec{v}$ which comprises g coding coefficients in the FF, $\vec{x} = M \cdot \vec{v}$, where M represents the original g packets in matrix form.

In contrast, for a Telescopic code, the coding vectors $\tilde{v}$ includes elements in multiple fields with different sizes. Let $\vec{q}$ be defined as the list of field size of length g, $|\vec{q}|=g$, corresponding to the elements in the coding vector $\vec{v}$. Without loss of generality, an ordering can be imposed on the list of field sizes, for example $\vec{q}_i \leq \vec{q}_{i+1}$, $\forall i \in [1, g]$. The size of the coding vector can be computed as $$|\vec{v}| = \Sigma_{i=1}^{|\vec{q}|} \lceil \log_2(\eta_i) \rceil [\text{bits}] \qquad (6)$$

A receiver that has collected any g linearly independent coded (or uncoded) packets can invert the performed coding operations and thus recreate the original data, $M = \hat{X} \cdot \hat{V}^{-1}$, where $\hat{X}$ is the collected coded packets and $\hat{V}$ is the corresponding collected coding vectors. It will be appreciated that, without using network coding (or, more generally, an erasure correcting code), the receiver would instead have to collect all original packets.

Figure 2:
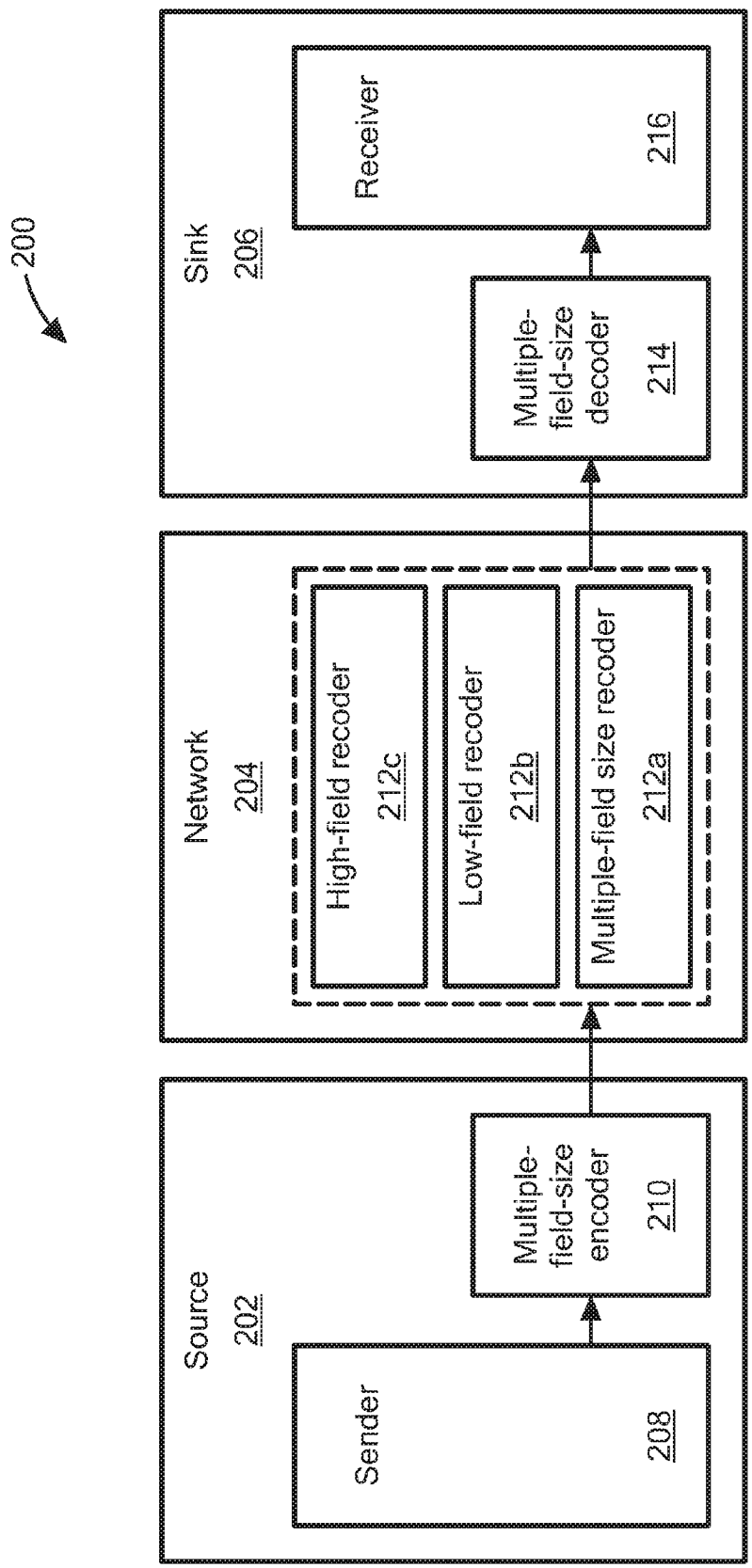
FIG. 2 is a block diagram of an illustrative network system using composite extension fields.

Referring now to FIG. 2, an illustrative network coding system 200 utilizes composite extension finite fields. As described below, the system 200 may utilize Telescopic codes, however it will be appreciated that composite extension finite fields can be used with other coding schemes, including random linear network code (RLNC) and Fulcrum network codes.

The illustrative system 200 includes a source node 202, an intermediate network node 204, and a receiver (or "sink") node 206, which may correspond to a source 102, intermediate node 104, and receiver 106 in FIG. 1, respectively. Although FIG. 2 shows one intermediate node 204, it will be appreciated that, in general, a source node and a receiver node may be connected via an arbitrary number of intermediate nodes (i.e. block 204 represents a network having an arbitrary topology).

The source 202 comprises a sender 208 and a multiple-field-size encoder 210. The sender 208 generates or otherwise provides source (or "original") data packets to the encoder 210. As in traditional RLNC, the multiple-field-size encoder 210 generates coded packets by multiplying source with a coding vector. Thus, a coded packet is calculated as the sum of the products for each packet multiplied with the corresponding element in the coding vector. However, in contrast to traditional RLNC, the coding vector includes elements chosen from multiple fields (i.e., composite extension finite fields). In some embodiments, the size of a resulting coded packet is identical to that of one of the original data packet. An illustrative coding technique that may be used within a source node 202 is described next.

The encoding process for Telescopic codes is similar to encoding in RLNC. In particular, a coded packet $\vec{x}$ may be generated by multiplying the original data M with a coding vector $\vec{v}$. Thus, a coded packet is calculated as the sum of the products for each packet multiplied with the corresponding element in the coding vector $$\vec{x} = \bigoplus_{i=1}^{|\vec{q}|} M_{i,j} \otimes \vec{v}_i, \forall j \in \left[1, \left\lceil \frac{B}{\lceil \log_2(\vec{q}_i) \rceil} \right\rceil \right] \qquad (7)$$

Where $\vec{v}_i$ is a random element drawn from the field $\vec{q}_i$. The size of the resulting coded packet is identical to that of one of the original packet.

A source node 206 may include a multiple-field-size decoder 214 and a receiver 216. The decoder 214 receives coded packets transmitted from the source 202 via the network 204 and uses a Gaussian elimination technique to recover the source data packets. Given the underlying code structure, the decode 214 may start by identifying pivot elements from coefficients of the smaller field (e.g., $\mathbb{F}_2$). Using those pivot elements, the decoder 214 can start eliminating its contribution from the other linear combinations using only smaller-field operations. After all possible pivot elements in the smaller field have been identified and its contribution eliminated from the remaining coded packets, the decoder 214 can start identifying pivots in the second smallest field (e.g., $\mathbb{F}_{2^2}$). After eliminating the contribution from coefficients in the second smallest field, the decoder 214 focuses on the next higher field, and so on.

Decoding can be performed efficiently in the same way as traditional RLNC using Gaussian elimination, with the following steps.

1) Forward substitute: each previously received symbol, $\vec{u}$, into the received symbol $\vec{v}$, $\vec{v} = \vec{v} + \vec{u} \cdot \vec{v}_r$ s.t. $\vec{v}_r = 0$, where r is the pivot element identified for the previously received symbol; hence it, $\vec{u}_r = 1$.

2) Identify pivot: for the resulting symbol, $\vec{v}_p = \min(\vec{v} \neq 0)$ and normalize wrt $\vec{v}_p$, $\vec{v} = \vec{v} \cdot \vec{v}_p^{-1}$.

3) Backward substitute: the partially decoded symbol into previously received symbols $\vec{u}$, $\vec{u} = \vec{u} + \vec{v} \cdot \vec{u}_p$ s.t. $\vec{u}_p = 0$.

From Equation (3), the addition of two coding vectors (and coded packets) is valid, and since $\vec{u}_i = 0$, $\forall i \in [1, p]$ and $\vec{q}_p \leq \vec{q}_j$, $\forall j \in [p, g]$ all multiplication performed during decoding is also valid.

FIG. 3 is an illustration of the initial coding matrix 300 and a partially decoded matrix 302. The partially decoded matrix 302 may correspond to a state of the initial coding matrix 300. In the figure, the notation $\mathbb{F}_q$ (e.g., $\mathbb{F}_2$ and $\mathbb{F}_{2^2}$) is used to represent an element drawn from a specific field q, without specifying its exact value.

Given the underlying structure, the decoder 214 may begin by identifying pivot elements from coefficients of the smaller field (leftmost in the coding matrix 300), $\mathbb{F}_2$ in this example. Using those pivot elements, the decoder 214 can eliminate its contribution from the other linear combinations using only $\mathbb{F}_2$ operations. After all possible pivot elements in $\mathbb{F}_2$ have been identified and that field's contribution eliminated from the remaining coded packets, the decoder 214 can identify pivots in the second smallest field, namely, $\mathbb{F}_{2^2}$ in this example. After eliminating the contribution from coefficients in $\mathbb{F}_{2^2}$, the decoder 214 can repeat this process for the next higher field, and so on.

Referring again to FIG. 2, an intermediate node 204 in the network can employ several different techniques to recode packets encoded using composite extension fields (e.g., a Telescopic code). Because such codes use coding vectors having elements drawn from fields of different sizes, recoding is similar, but not identical to RLNC. In general, recoding should retain the structure of the coding vector and thus a recoded packet's coding vector, $\tilde{v}$, should be indistinguishable from an "original" coded packets coding vector, defined as $\tilde{v}_i \in q_i$, $\forall i$. In various embodiments, recoding is performed using a local recoding vector, denoted $\vec{w}$, having r elements, where r is the rank of the decoder and $w_i$ is a random element drawn from the field $\vec{q}_i$.

$$\vec{x} = \bigoplus_{i=1}^{r} \hat{X}_{i,j}^T \otimes \overline{w_i}, \forall j \in \left[1, \left\lceil \frac{B}{\lceil \log_2(\vec{q}_i) \rceil} \right\rceil\right] \quad (8)$$

$$\vec{v} = \bigoplus_{i=1}^{r} \hat{V}_{i,j}^T \otimes \overline{w_i}, \forall j \in \left[1, \left\lceil \frac{B}{\lceil \log_2(\vec{q}_i) \rceil} \right\rceil\right] \quad (9)$$

In various embodiments, an intermediate node 204 includes implementations of multiple different recoding techniques. For example, the illustrative node 204 in FIG. 2 implements a multiple-field-size recoder 212a, a low-field recoder 212b, and a high-field recoder 212c.

The multiple-field-size recoder 212a may be configured to partially decode all incoming packets, thus keeping PT in reduced echelon form. This approach requires additional computational work if the intermediate node 204 does not decode (i.e., if it only recodes), but ensures that the recoded coding vector is indistinguishable from the original coding vector. Since $\tilde{v}_i \leq \vec{w}_i$, $\forall i \in [1, r]$ and $\tilde{v}_i$, $\forall i \in [r+1, g]$ is given by Equation (9) where $\vec{w}_i \leq \vec{q}_i$, $\forall i \in [1, r]$, $j \in [r+1, g]$ hence $\vec{v}_i \leq \vec{q}_i$, $\forall i \in [r+1, g]$ by Equations (4) and (5).

The low-field recoder 212b may be configured to perform recoding using a local coding vector with elements in the smallest field, $\mathbb{F}_2$ in this example. As with the multiple-field-size recoder 212a, the resulting recoded vector $\tilde{v}$ here will be also be indistinguishable from the original coding vector. Although recoding in the smallest field may be reduce the processing required at the intermediate node 204, it is appreciated that the probability of linear dependency at the receiver 206 may be impacted negatively due to the use of a small field.

The high-field recoder 212c may be configured to perform recoding over one of the extension fields with size $q_x$ then the elements in $\tilde{v}$ will have size $\max(\vec{q}_i, q_x)$, $\forall i \in [1, g]$. It is appreciated that this approach can reduce the probability of linear dependency at the receiver 206 but also increases the overhead from the coding vector to $|\tilde{v}| = \Sigma_{i=1}^{g} \lceil \log_2(\max(\vec{q}_i, q_x)) \rceil$ [bits].

The specific recoding strategy used may be based upon various criteria, including but not limited to: (1) requirements for maintaining code structure; (2) processing capability of an intermediate node 204; and (3) desired/expected probability that packets received at a receiver node 206 are linearly independent of each other. Using the low-field recoder 212b, code structure is maintained, whereas code structure is generally not maintained with either the multiple-field-size recoder 212a or the high-field recoder 212c (although it may be maintained in the multiple-field-size recoder 212a under special circumstances). The low-field recoder 212b requires the lowest computational effort and the high-field recoder 212c requires the highest computational effort. On the other hand, the low-field recoder 212a generally provides the lowest probability of linear independence and the high-field recoder 212c provides the highest probability.

Figure 4:
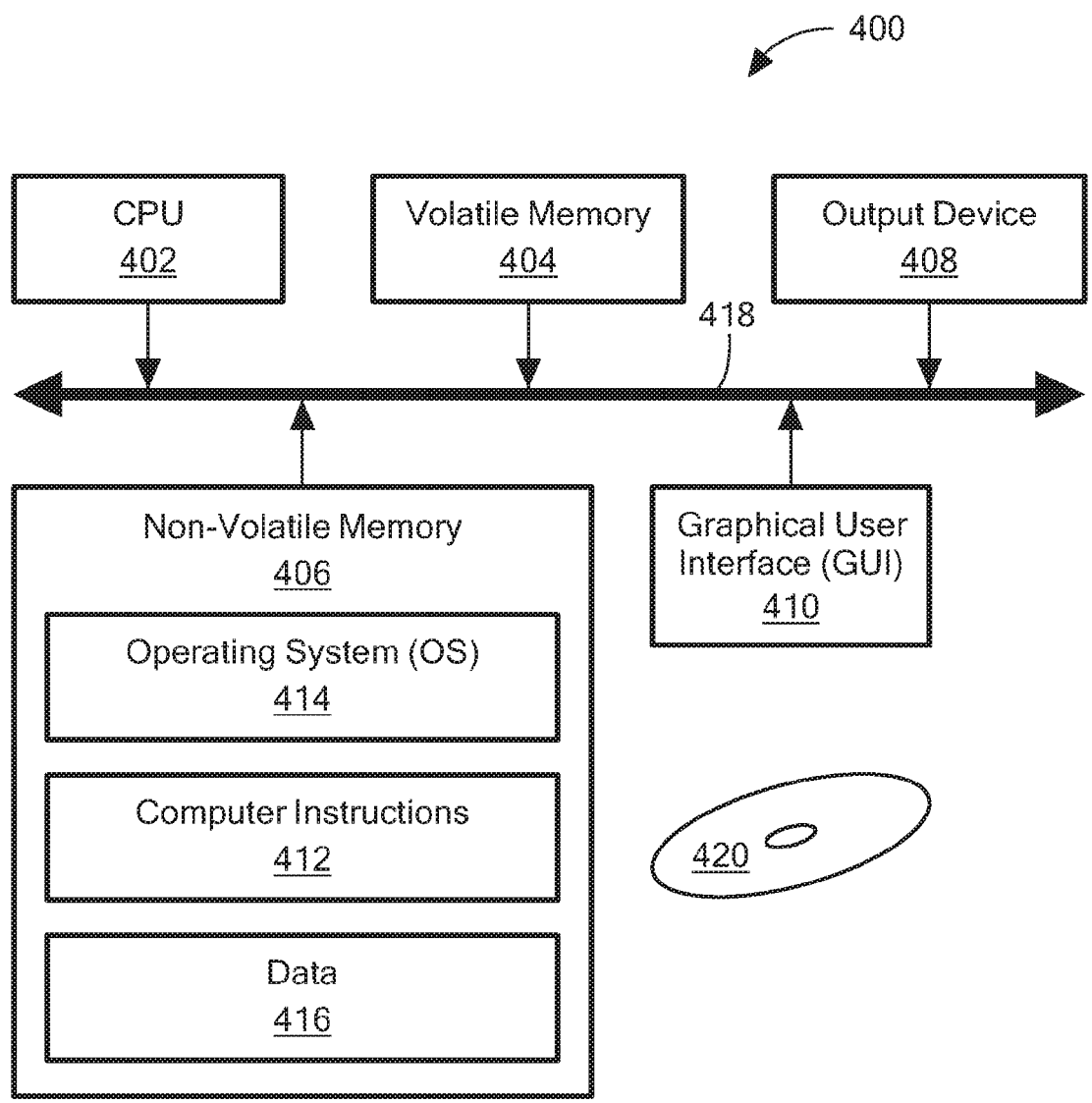
FIG. 4 is a schematic representation of an illustrative computer for use with the systems of FIGS. 1 and 2.

FIG. 4 shows an illustrative computer or other processing device 400 that can perform at least part of the processing described herein. The computer 400 includes a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 stores computer instructions 412, an operating system 414, and data 416. In one example, the computer instructions 412 are executed by the processor 402 out of volatile memory 404. In one embodiment, an article 420 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. In a network having at least a first node and a second node, a method comprising:
    receiving n source packets;
    generating a first coding vector comprising n elements, each element of the first coding vector selected from a corresponding one of a plurality of fields, wherein at least two of the plurality of fields have different sizes;
    generating a plurality of encoded packets, each encoded packet corresponding to a linear combination of the source packets according to the first coding vector; and
    transmitting the encoded packets from the first node to the second node.

2. The method of claim 1 wherein the plurality of fields comprise a series of composite extension finite fields.

3. The method of claim 2 wherein the series of composite extension finite fields comprise fields of $\mathbb{F}_M$, $\mathbb{F}_{M^N}$, and $$\mathbb{F}_{M^{N^O}},$$

where M, N, and O are integers greater than 1.

4. The method of claim 1 wherein generating a first coding vector comprises generating a vector comprising n elements ordered by field size.

5. The method of claim 1 wherein generating an encoded packet comprises:
    calculating the sum of the products for each source packet multiplied with a corresponding element in the coding vector,
    wherein calculating the sums of the products are performed in at least two fields having different sizes.

6. The method of claim 1 further comprising:
    receiving, in the second node, a plurality of encoded packets transmitted from the first node; and
    decoding the received encoded packets.

7. The method of claim 6 wherein decoding the received encoded packets comprises decoding the received encoded packets using the first coding vector processed from a smallest field size to a largest field size.

8. The method of claim 6 where decoding the received encoded packets comprises using Gaussian elimination.

9. The method of claim 8 wherein decoding the received encoded packets comprises performing addition and multiplication of elements from fields having different sizes.

10. The method of claim 9 further comprising:
    receiving, in the second node, a plurality of encoded packets transmitted from the first node;
    recoding the received encoded packets to generate a plurality of recoded packets; and
    transmitting the recoded packets to a third node in the network.

11. The method of claim 10 wherein recoding the received encoded packets comprises recoding the received encoded packets using operations in only one of the plurality of fields.

12. The method of claim 11 wherein recoding the received encoded packets comprises recoding the received encoded packets using operations in only a smallest one of the plurality of fields.

13. The method of claim 12 wherein recoding the received encoded packets comprises recoding the received encoded packets using operations in only a largest one of the plurality of fields.

14. The method of claim 11 wherein recoding the received encoded packets comprises recoding the received encoded packets using operations in multiple ones of the plurality of fields.

15. The method of claim 11 further comprising:
    selecting a recoding strategy as one of: recoding using operations in only a smallest one of the plurality of fields, recoding using operations in only a largest one of the plurality of fields, or recoding using operations in multiple ones of the plurality of fields, wherein recoding the received encoded packets comprises recoding the received encoded packets using the selected recoding strategy.

16. The method of claim 15 wherein selecting a recoding strategy comprises selecting a recoding strategy based upon processing resources available within the second node.

17. The method of claim 15 wherein selecting a recoding strategy comprises selecting a recoding strategy based upon requirements for maintaining code structure.

18. The method of claim 15 wherein selecting a recoding strategy comprises selecting a recoding strategy based upon a desired probability that packets received at the third node are linearly independent.

19. The method of claim 15 wherein recoding the received encoded packets to generate a plurality of recoded packets comprises processing the first coding vector from a smallest field size to a largest field size.

* * * * *